Nov. 24, 1959          E. QUINN          2,914,007

MACHINES AND METHODS FOR INSERTING CEMENT BONDED SEAMS

Original Filed April 26, 1955          11 Sheets-Sheet 1

*Inventor*
Edward Quinn
By his Attorney
Thomas J. Ryan

Inventor
Edward Quinn
By his Attorney
Thomas J. ...

Inventor
Edward Quinn
By his Attorney

Inventor
Edward Quinn
By his Attorney

Nov. 24, 1959 E. QUINN 2,914,007
MACHINES AND METHODS FOR INSERTING CEMENT BONDED SEAMS
Original Filed April 26, 1955 11 Sheets-Sheet 5
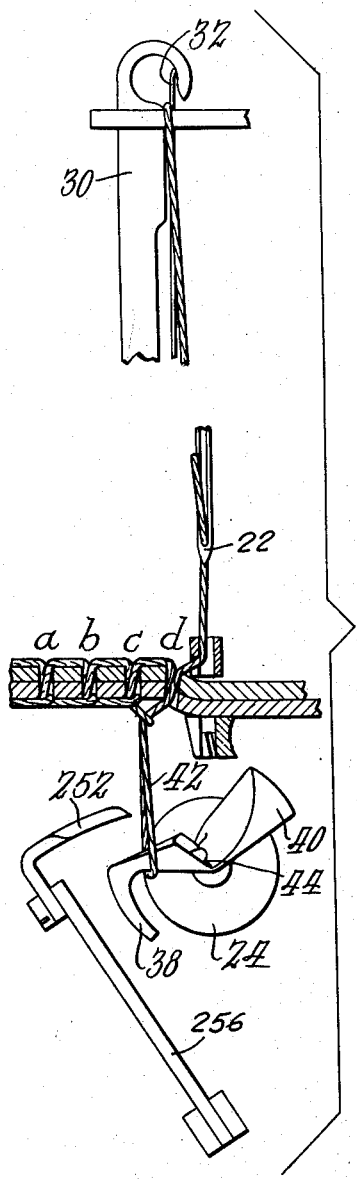
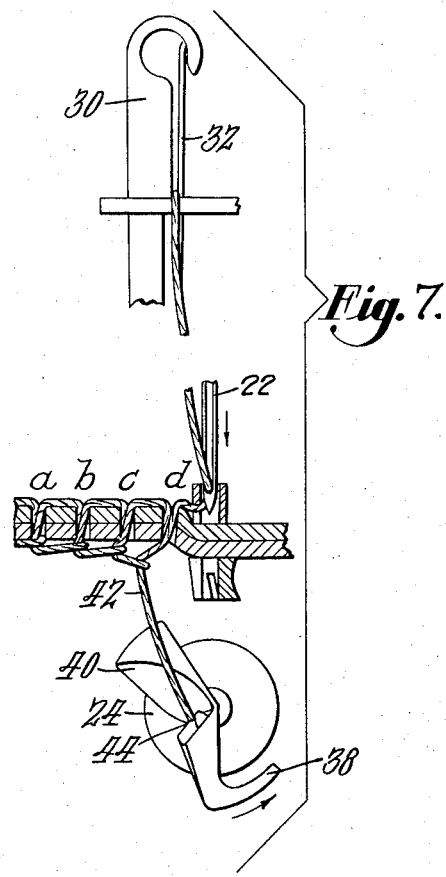
*Inventor*
*Edward Quinn*
*By his Attorney*

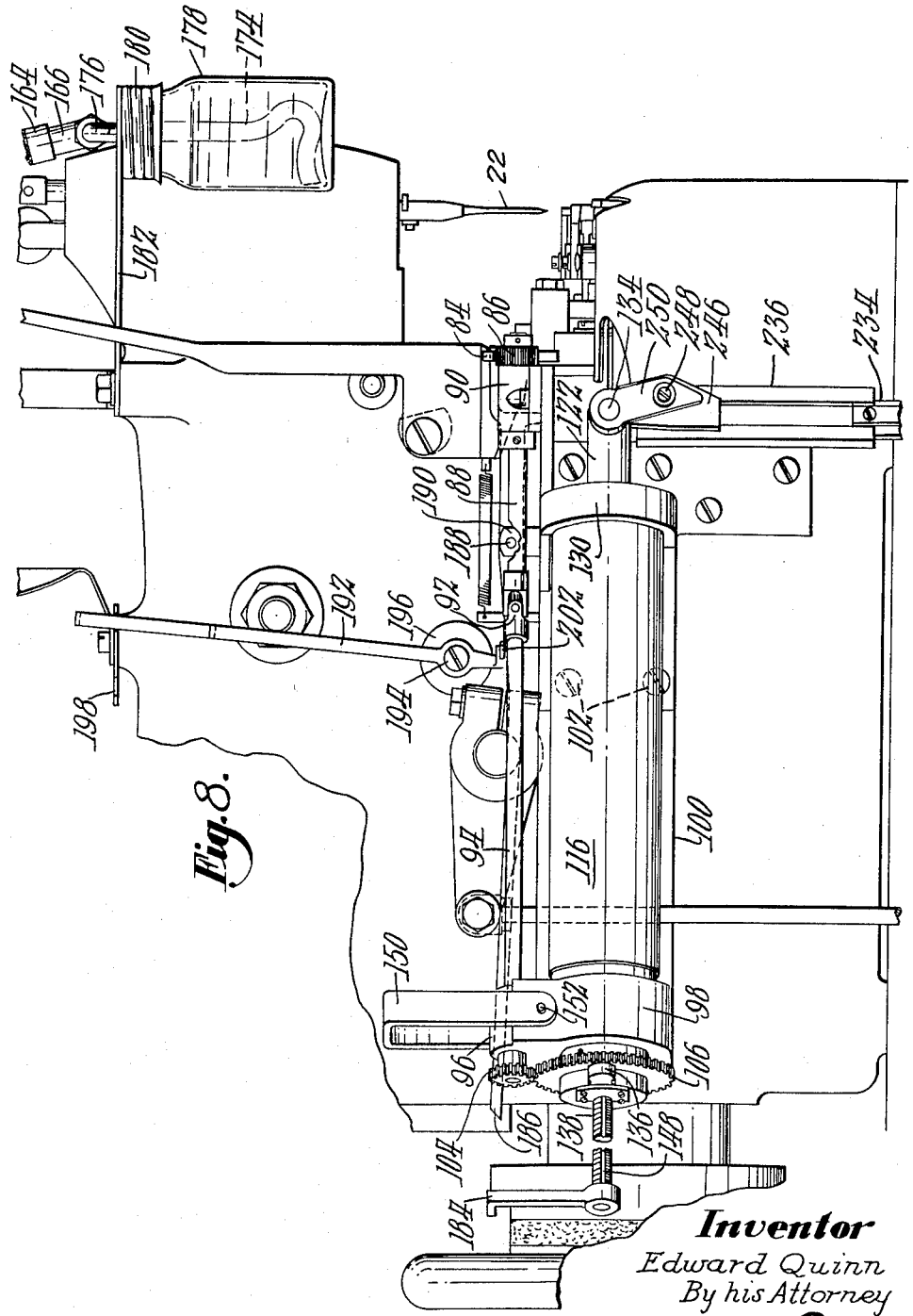

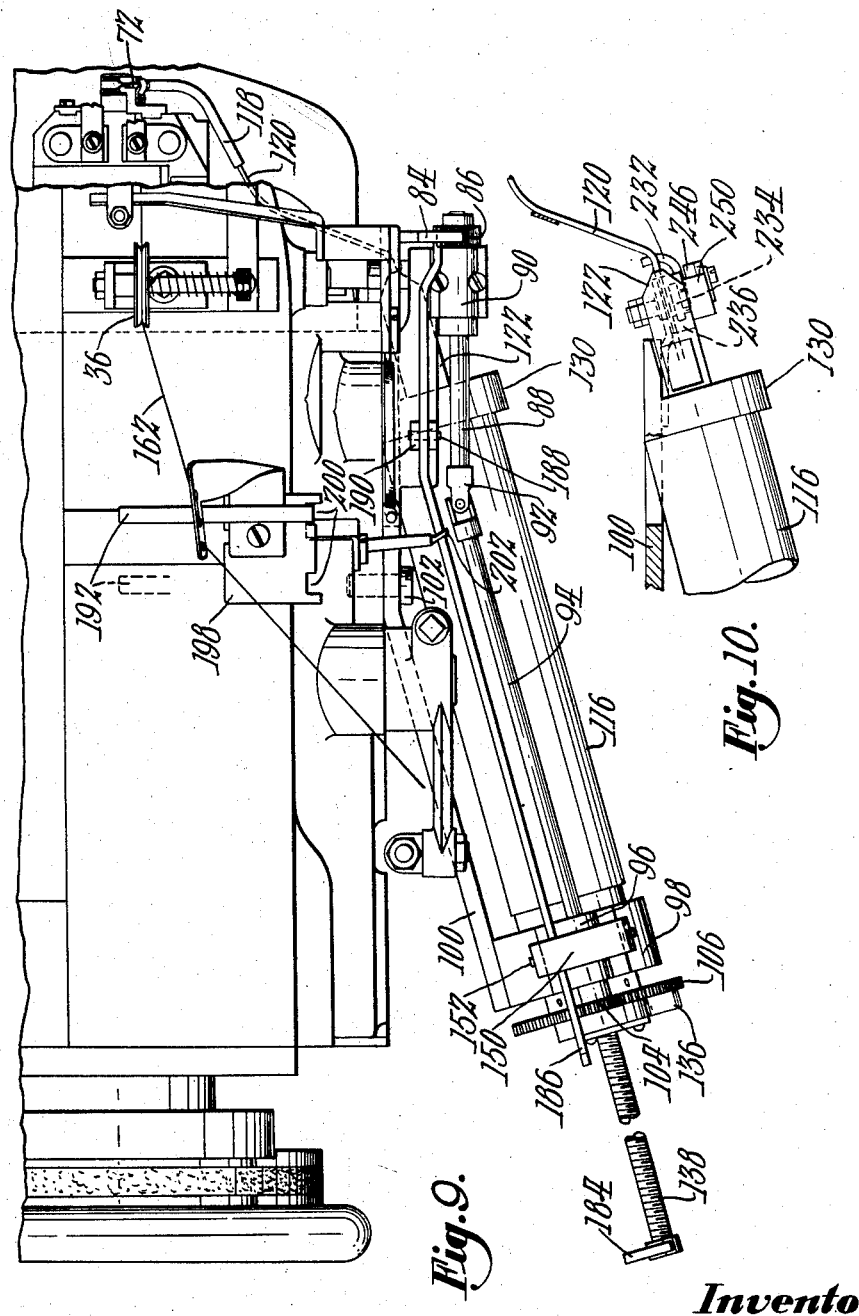

Inventor
Edward Quinn
By his Attorney
Thomas J Ryan

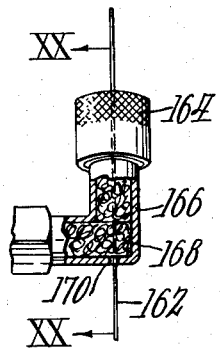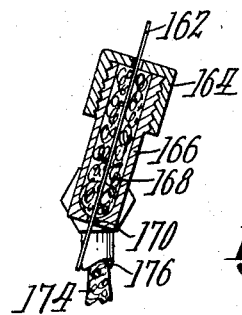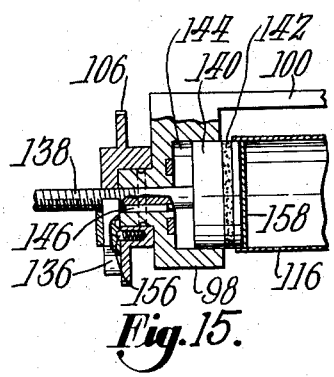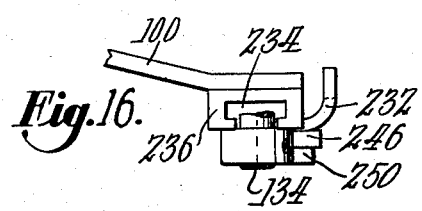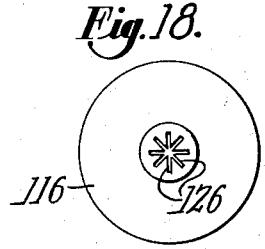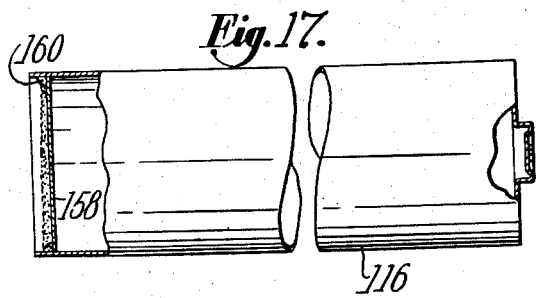

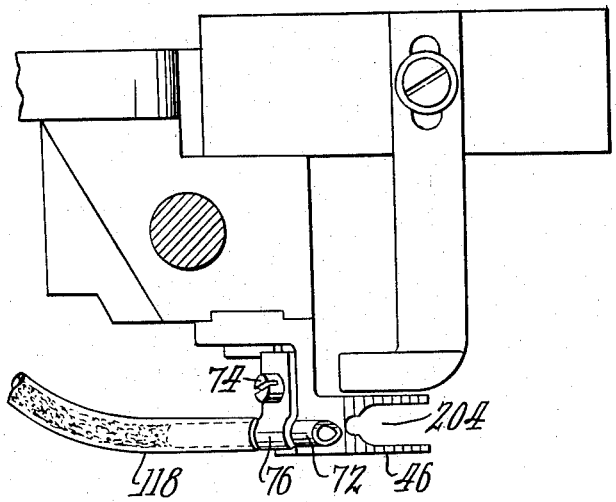
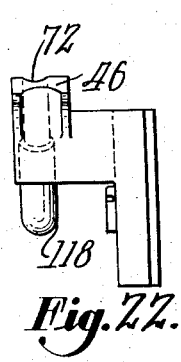
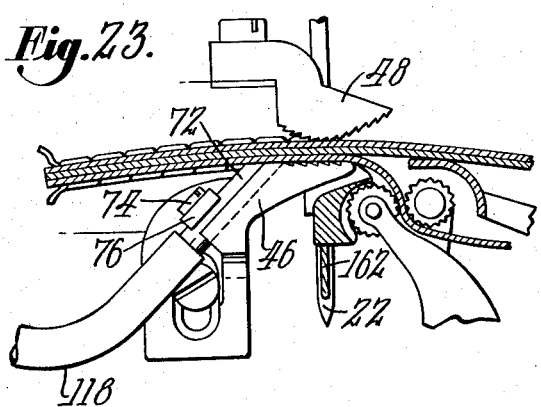

Nov. 24, 1959     E. QUINN     2,914,007
MACHINES AND METHODS FOR INSERTING CEMENT BONDED SEAMS
Original Filed April 26, 1955     11 Sheets-Sheet 11
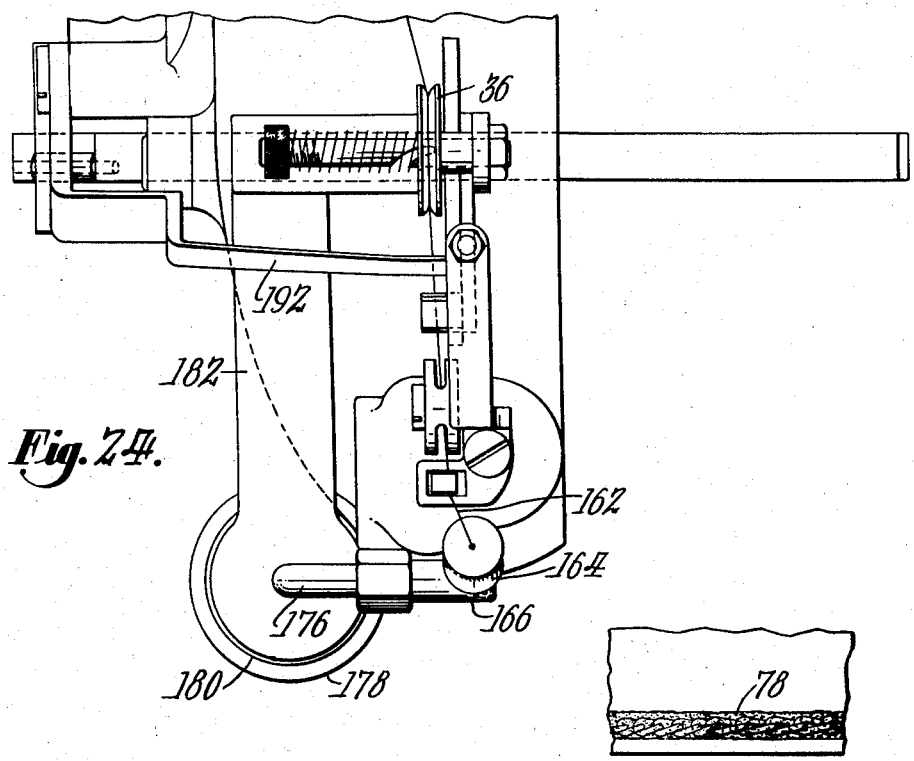
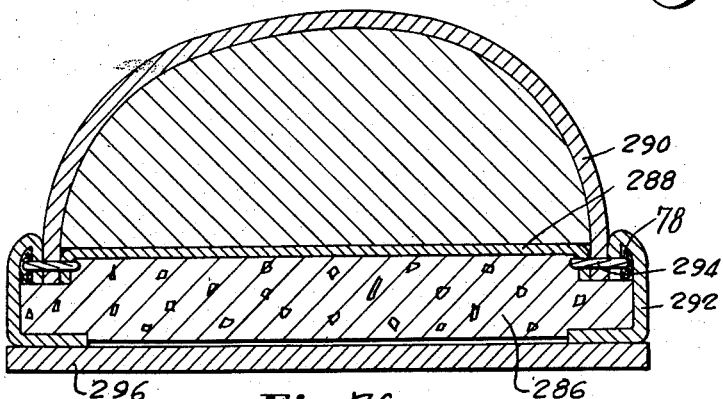
*Inventor*
Edward Quinn
By his Attorney

United States Patent Office 2,914,007
Patented Nov. 24, 1959

2,914,007

MACHINES AND METHODS FOR INSERTING CEMENT BONDED SEAMS

Edward Quinn, Saugus, Mass., assignor to United Shoe Machinery Corporation, Flemington, N.J., a corporation of New Jersey Original application April 26, 1955, Serial No. 503,904. Divided and this application December 5, 1956, Serial No. 626,354

11 Claims. (Cl. 112—43)

The present invention relates generally to the art of sewing, and more particularly to improvements in machines and in methods for inserting cement reinforced seams in work pieces. In one aspect my invention is more specifically directed to the manufacture of slip-lasted shoes but the machines and methods of my invention are equally applicable to the sewing of a wide variety of articles other than shoes.

As hereinafter exemplified, the machine is of the so-called Wilcox and Gibbs construction, more particularly disclosed in United States Letters Patent No. 1,864,510, granted June 21, 1932, on an application filed in the name of B. T. Leveque. The subject matter of the present application has already been disclosed in an application for United States Letters Patent Serial No. 503,-904, filed April 26, 1955 (now Patent No. 2,905,118, granted September 22, 1959), in the name of the present inventor of which application the present one is a division.

The desirability of reinforcing a seam with cement is readily apparent. A chain-stitch seam, for example, may be unraveled by the continued pull upon its thread. The application of cement to such a seam locks each stitch in place against unraveling, and is, accordingly, highly desirable. In any type of seam a cement bond between the sewing thread and the parts operated upon, especially if the cement is applied in sufficient quantities to form a ribbon extending laterally beyond the seam, also compensates for weakening of the material of the work parts in the area of the seam by the needle perforations, and, in addition, yields a seam of more uniform appearance.

Several difficulties are encountered in the design of a practical machine for forming cement bonded seams because the requirements for a successful conventional sewing operation are somewhat incompatible with those for an adequate bond of a cement deposit on the thread of a seam. It will be readily appreciated that in order to operate effectively the stitch-forming and work-feeding devices of a sewing machine must be kept free of liquid adhesive agent or hardened cement which might interfere with the thread manipulation capability of the stitch-forming devices or prevent the proper engagement and release of the work by the feeding devices. It will also be realized that obtaining an adequate bond between thread and cement is dependent upon thorough penetration of the thread by the adhesive agent while the latter is in its liquid or plastic form. Also, it is necessary, in order to facilitate effective cemented work, that a quick drying adhesive agent be used. The period of time during which such adhesive agent remains liquid is too brief to permit its adequate absorption by the thread merely by being deposited thereon. It is therefore necessary that the absorption be otherwise stimulated by motion of the thread while in contact with a surplus of adhesive agent to separate the individual fibers of the thread for quick entry of the adhesive agent into the spaces thus formed. In a conventional sewing machine, motion of the thread is limited to the stitch being formed because the stitch-forming devices are arranged and operated in such a manner that tension is applied and maintained in the thread continuously. If it is desired, therefore, to secure adequate bonding of cement to thread when using conventionally operated stitch-forming devices, it is necessary that a surplus of adhesive agent be deposited either in advance of the sewing point or in close proximity thereto in order to take advantage of the limited time of thread motion. Under these circumstances there is increased danger of spreading the surplus adhesive agent over the stitch-forming and work-feeding devices, which spreading would result in the unavoidable necessity for frequent stoppages for cleaning of the machine and perhaps the eventual cause of series damage thereto.

Another difficulty, which has heretofore interferred with the formation of a satisfactory bond between cement, the thread, and the work to which it has been applied, arises from the presence on the thread of wax and oils which are applied during its manufacture. These waxes and oils not only insulate the thread fibers from the grip of the cement but are caused to be absorbed by the work as a result of heat generated within the perforations by the rapid frictional movement of the needle and thread during the sewing operations. Thus, these waxes and oils also have a deleterious effect on the bond between the cement and the work.

It is an object of my invention to provide a machine which lends itself to the formation at high speeds of cement bonded seams. Another object is to provide means for depositing cement on seams in a sewing machine in such a way that the possibility of contaminating the stitch-forming and work-feeding devices of the machine by contact with the adhesive agent is substantially eliminated. A more particular object is to form a cement bonded chain stitch seam in such a manner that more intimate contact is established between the thread and the adhesive agent than can be accomplished with conventional chain stitch forming machines.

In the achievement of the foregoing objects an important feature of my invention resides in the use of an adhesive agent depositing nozzle arranged on a chain stitch sewing machine along stitches being tightened beyond the point of needle operation. The nozzle is in communication with a dispensing device actuated in conjunction with the work-feeding mechanisms of the machine to deposit a continuous ribbon of adhesive agent onto the seam. Novel connections between the work-feeding and adhesive dispensing device permit the quantity of adhesive agent deposited upon the seam to be varied independently of work feed and also permit the adhesive dispensing device to be disconnected and rendered inactive when it is desired to sew uncemented seams.

According to another feature of my invention, the formation of cement bonded chain-stitch seams, in which a more intimate contact is established between the thread and the adhesive agent, is enhanced by the use of a novel form of looper more particularly described and claimed in the parent application above referred to.

In a conventional chain-stitch machine of the Wilcox and Gibbs type the looper is formed to apply and maintain continuously a stitch tightening tension in the thread. Once a stitch is set in the conventional machine, tension on the thread is not relaxed to permit the latter to absorb any adhesive agent deposited on the thread. Accordingly, bonding is dependent almost entirely upon gradual penetration of the fibers of the thread while under tension, which tension greatly delays absorption of a heavy bodied adhesive agent, especially in the extremely short period elapsing before the adhesive agent reaches a semi-solid state where appreciable penetration no longer takes place under any conditions. To eliminate this difficulty I have provided a novel looper described more fully in application, Serial No. 503,904, which looper intermittently applies and relaxes tension in the thread, setting the stitches progressively along the seam with a sliding movement of the thread in several stitches at a time. By means of this novel looper a stitch is not fully tightened until it reaches a position several stitches removed from the point of needle operation. Before each stitch is fully set in the illustrative machine it receives a deposit of adhesive agent from the nozzle located beyond the sewing point. Subsequent relaxing and tensioning of the thread before final setting causes the threads in a stitch to move back and forth in the adhesive deposited thereon effectively massaging the adhesive into the spaces between the relaxed thread fibers before the formation of hardened cement. A superior bond is thereby established between the thread fibers and the hardened cement, materially improving the strength of the seam, eliminating the possibility of unraveling and making such a cement bonded seam useful in applications for which a conventional chain stitch seam is not generally regarded as practical.

In order to improve still further the bond between the thread and the hardened cement I provide an applicator for an adhesive solvent by which the thread is treated before reaching the needle. By this means oil and wax applied to the thread during its manufacture are dissolved and removed and the adhesive is absorbed more quickly by the thread. The quantity of solvent thus applied not only removes objectionable substances which would interfere with the formation of an effective bond but also improves the bond by saturating the thread and an area of the work adjacent to the seam, thus enabling the adhesive agent applied beyond the needle to be drawn into the spaces between the thread fibers and into the work pieces by capillary action.

Further objects, novel features and advantages of my invention will be more readily apparent from the following detailed description of an illustrative embodiment and essential procedures thereof taken with reference to the accompanying drawings, in which Fig. 1 is a view in front elevation of a sewing machine embodying the features of the present invention;

Fig. 6 is a detail view in left side elevation showing the positions of the stitch-forming devices while a stitch setting tension is being applied to a loop of needle thread and the thread is being withdrawn from the supply in an amount equal to that required for the succeeding stitch;

Fig. 7 is a similar view showing the positions of the parts after the full amount of thread is withdrawn from the supply and the tension has been released from the thread, the loop shown in Fig. 6 being spread for entry of the needle with the next succeeding loop of thread;

Fig. 8 is a view in rear elevation, partly broken away, of the sewing machine head, including thread treating and adhesive agent applying devices;

Fig. 9 is a plan view of the rear portions of the sewing head showing the adhesive agent applying device and a thread pull-off lever;

Fig. 10 is a detail plan view of a portion of the thread treating device, illustrating a delivery tube running to a nozzle on the feeding work support;

Fig. 15 is a sectional plan view of the parts shown in Fig. 13 taken along the line XV—XV of that figure;

Fig. 16 is a detail plan view of valve actuating connections in the adhesive agent applying device;

Fig. 17 is a plan view partly broken away in section and contracted in length of a replaceable adhesive agent container or cartridge employed in the adhesive agent applying device;

Fig. 18 is a delivery end view of the cartridge;

Fig. 19 is a sectional view of a portion of the thread treating device shown in Fig. 8;

Fig. 20 is another sectional view of the same device taken along the line XX—XX of Fig. 19;

Fig. 21 is a detail plan view of parts at the front of the machine, including a feeding work support and adhesive agent applying nozzle;

Fig. 22 is a detail view in front elevation of the feeding work support and nozzle;

Fig. 23 is a sectional view in left side elevation of parts surrounding the sewing point in the machine illustrating a sewing operation on relatively thin work of a conventional type of platform shoe;

Fig. 24 is a fragmentary plan view of the front end of the machine, including the thread treating device located above the sewing point;

Fig. 25 is a detail view of a portion of a cement bonded seam inserted by the machine and showing stitches of two different lengths and a uniform deposit of cement regardless of stitch length; and Fig. 26 is a cross sectional view of the toe in a completed platform shoe, embodying a cemented seam according to the present invention.

Figure 1:
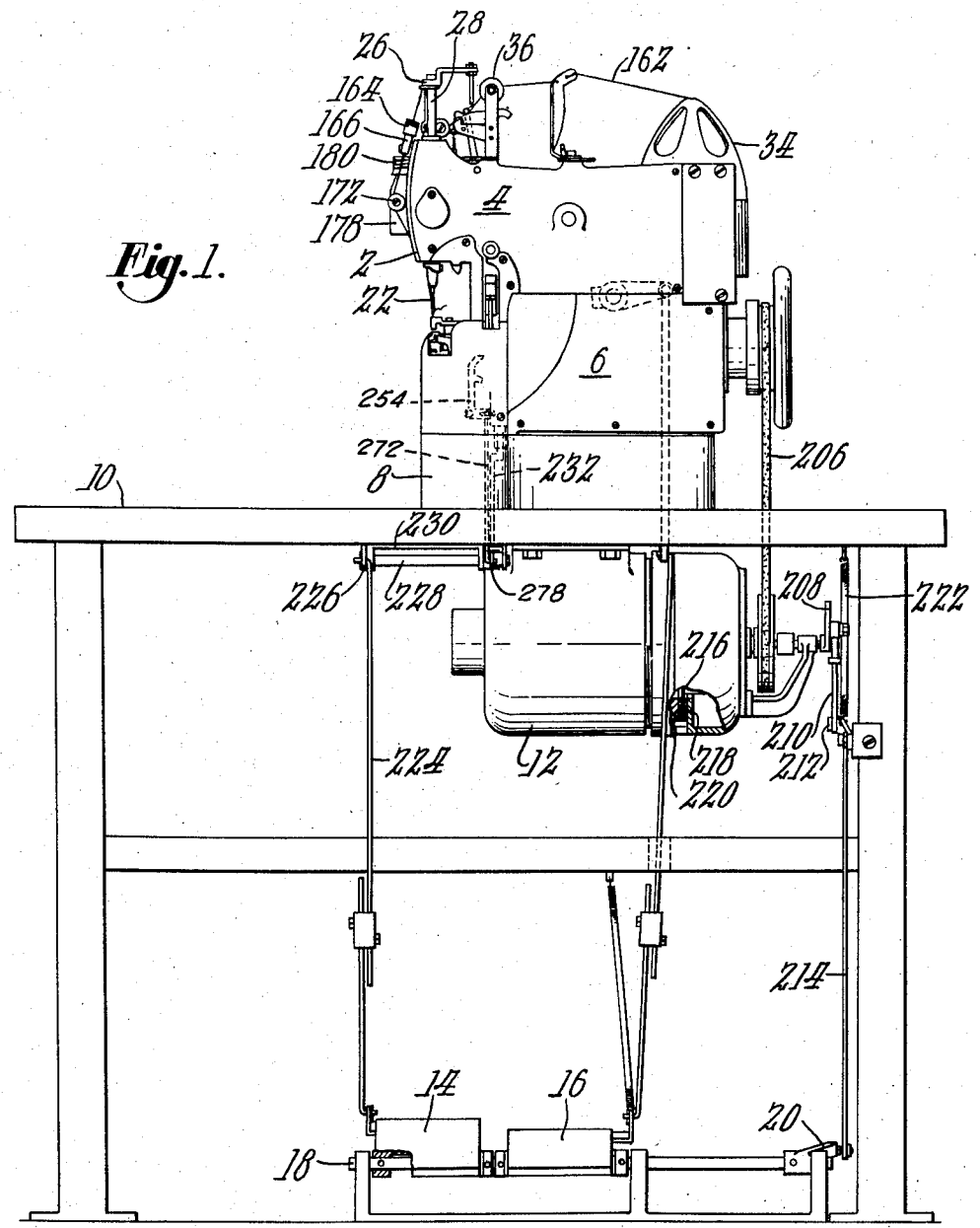

The machine illustrated in the drawings is an eye-pointed needle chain-stitch sewing machine of the Wilcox and Gibbs type provided with work-feeding and non-work-feeding clamps for supporting the work at the sewing point and with a platform cover strip pilot guide similar to that disclosed in United States Letters Patent No. 2,705,464, granted April 5, 1955, upon an application filed in the name of Fred C. Eastman, for Improvements in Shoe Sewing Machines and United States Letters Patent No. 2,722,182, granted November 1, 1955, in the names of the present inventor and N. S. Ferland. The illustrated machine is provided with adhesive agent applying devices for bonding the chain portion of the chain stitch seam with a ribbon of hardened cement to one surface of the platform cover strip. As to its stitch-forming devices, the machine generally is similar to that of the Leveque patent above identified.

The machine has a main sewing head frame 2 of hollow lubricant retaining construction enclosed by a pair of cover plates 4 and 6. As illustrated in Fig. 1, the head frame 2 is secured to a spacing frame 8 fixed to the upper surface of a mounting table or counter 10 of a conventional form. Beneath the counter 10 is a combined driving motor and transmitter 12 and two control treadles 14 and 16. The treadle 14 is pinned to a shaft 18 and the treadle 16 is loosely mounted thereon. The shaft has secured to it a machine control arm 20.

The stitch-forming devices of the machine comprise a straight eye-pointed needle, indicated at 22, a looper 24 (Fig. 3), and a take-up 26 (Fig. 1) in the form of a perforated plate attached to the upper end of a reciprocating needle supporting bar 28. The take-up plate has passing through its perforation a frictional thread tension device in the form of a fixed rod 30 (see Fig. 6) having a hooked upper end and a light flat spring 32 running along the rod between which and the spring the thread is wedged as soon as the needle starts downwardly to control the thread given up by the take-up and to prevent its being drawn too freely through the work by the looper. Besides the tension device 30, 32 the thread passes from a source of supply 34 (Fig. 1) through a main tension device in the form of friction disks 36. The operation of the stitch-forming devices is substantially the same as that of the prior Wilcox and Gibbs machine.

The form of the looper 24 contributes substantially to an important feature of my invention in affording a deep penetration of a deposit of an adhesive agent into the thread of a chain stitch seam. Such penetration causes a superior bond with the thread than would be possible if a conventional looper were employed. This feature will be more fully appreciated from a brief preliminary description of a conventional looper and its operation which are described in greater detail and depicted more fully in the above-identified parent application, to which reference may be had for a better understanding.

A conventional looper comprises a loop entering beak at one side of its axis of rotation and a loop spreading wing at the opposite side of its axis. Once a needle loop is engaged by the looper beak tension on the thread is sustained as the loop is distended and moves first over a throat portion of the looper, then over the wing and along the heel of the beak to a let-off point, which is a surface angularly disposed relatively to the heel. While the loop is engaged by the let-off point it is enchained by the next succeeding needle loop, which has been entered by the looper beak. As looper rotation and work feed progress, the first-mentioned loop slips off the let-off point and is thereafter tightened and the stitch set during continued distension of the succeeding loop. The tension on the succeeding loop is sustained through the greater part of each sewing cycle and the stitch once initially set is not thereafter permitted to loosen.

The improved looper 24 of the present machine is provided with a loop entering and distending beak 38 pointed in the direction of work feed while entering each needle loop (Fig. 6) and a spreading wing 40 at the opposite side of its axis of rotation, the thread-engaging surfaces between its loop entering beak and wing being so formed that a maximum stitch setting tension is applied to the thread briefly, and a full amount of thread sufficient for a stitch being formed is withdrawn from the supply in each sewing cycle before a loop engages the looper throat. Thereafter, for the remainder of each sewing cycle there is a definite relaxation in tension, and slack thread is provided in each loop engaged by the looper, so that regardless of the wedging action of the thread within the perforation in the work by the needle, excessively heavy tensions are avoided and no greater amounts of thread are withdrawn from the supply than are required by the looper in performing its function.

The operation of the improved looper 24 will be outlined with reference to Figs. 6 and 7 in which stitches designated a, b, c, and d are shown in the process of being formed. The application of maximum tension to a loop 42 is illustrated in Fig. 6, in which the needle 20 is shown at its uppermost position. The thread, which at this time is free to move between the rod 30 and the spring 32, is withdrawn by the action of the looper 24 in an amount sufficient for the formation of the next stitch. Thereafter, as the looper continues to rotate to the position illustrated in Fig. 7, the wing 40 enters the loop 42 to spread the latter for enchainment with a succeeding loop. It will be noted that in the position of Fig. 7 the loop 42 is free of tension, having moved into a loop detaining throat 44. As a result of this relaxation of tension stitch c is allowed to loosen as are to a lesser degree stitches b and a. By employing the novel looper 24 the stitches of a seam are tightened progressively instead of receiving their full stitch setting tension at one time and having the tension sustained, as is the case when a conventional looper is employed. Thus, when tension is relaxed, previously formed stitches are relaxed as the thread slips back through the needle perforations, the amount of back slippage decreasing progressively in proportion to frictional resistance on the thread, at a distance from the point of needle operation. The final progressively applied tension on each stitch and the accompanying motion of the thread at a distance from the needle aids materially in working the adhesive agent into the thread and in enabling the hardened cement to obtain a secure grip on the thread and work.

To feed the work presented to the illustrated machine, it is gripped periodically by the work-feeding clamp and moved a stitch length. Thereafter, the nonfeeding clamp, shown in Fig. 3 and comprising a nonfeeding work support 45 and a nonfeeding presser foot 47, engages the work and secures it against displacement after release and back-feeding movement of the feeding clamp.

Figure 2:
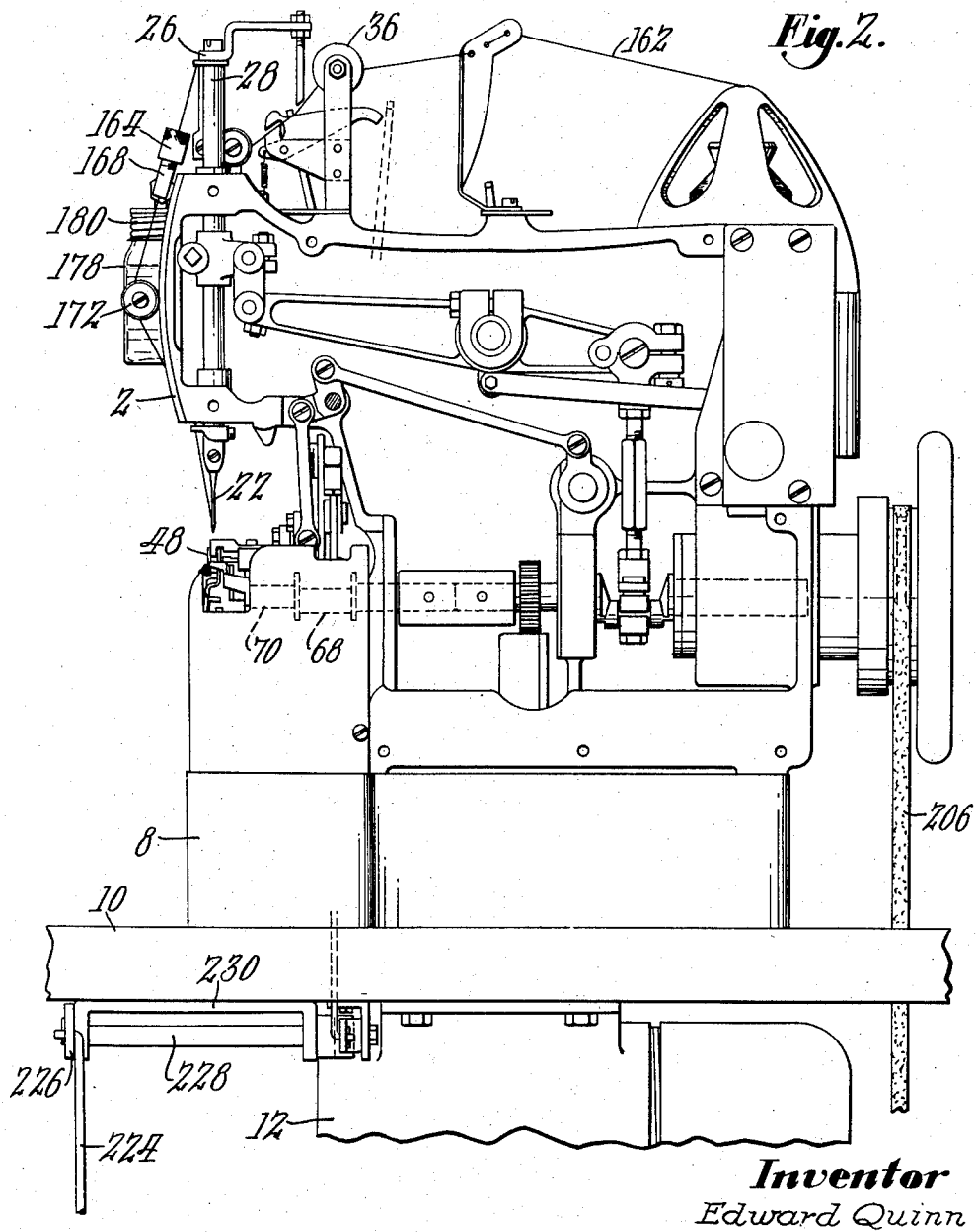
Fig. 2 is a similar view on a larger scale of a sewing head of the machine with cover plates removed illustrating portions of a driving motor and control connections.
Figure 3:
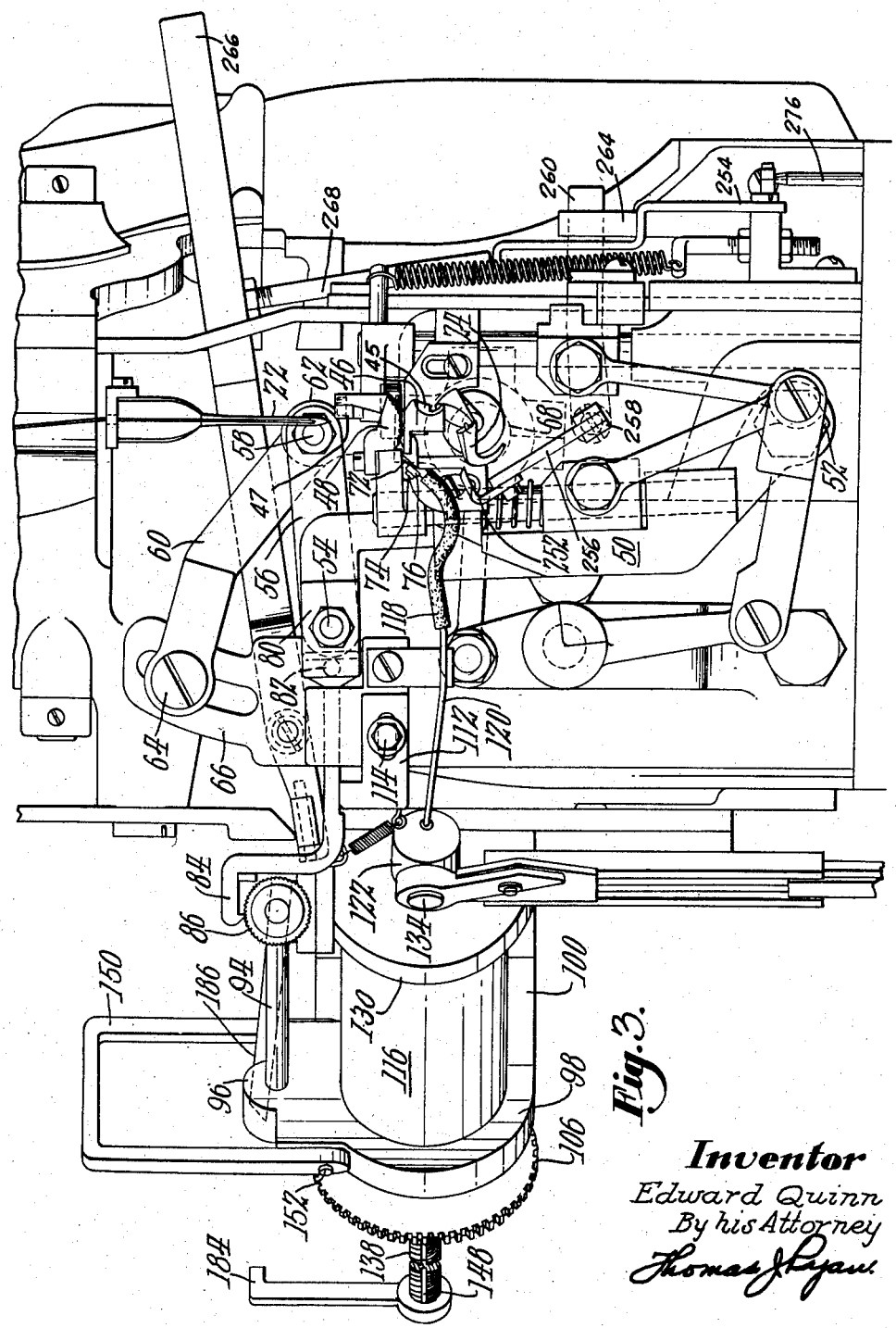
Fig. 3 is a view in left side elevation on an enlarged scale of the parts in a lower portion of the sewing head in the machine of the present invention.

The feeding clamp comprises a work support or table 46 and a presser foot 48, shown in Fig. 3. The work support 46 is secured to the upper end of a feed carrier 50, pivoted on a bolt 52 passing loosely through its lower end and into the fixed portion of the head frame 2. At the upper end of the carrier 50 is a stud 54 on which is pivoted a link 56, also carrying a pin 58 forming a pivotal connection between it and a reversely bent adjusting link 60 and also a connecting rod 62. The link 60 has passing through its end remote from the pin 58 a clamp bolt 64 adjustably secured in an arcuate slot of a fixed plate 66 projecting upwardly from the sewing head. The connecting rod 62 extends downwardly from the pin 58 and surrounds a crank 68 on a main sewing shaft 70 (see also Fig. 2) for imparting a work-feeding movement to the feeding clamp 46, 48. For adjusting the length of each stitch the feeding movement imparted to the work by the feeding clamp is regulated by changing the position of the bolt 64 in the slot of the plate 66. In other respects the mechanism for actuating the feeding and nonfeeding clamps is the same as that disclosed in application Serial No. 503,904.

To form cement on a seam inserted by the machine while employing the method of the present invention intermittently acting means is provided for depositing an adhesive agent on the work and thread beyond the point of operation of the sewing needle along those stitches of the seam which are being progressively tightened. The deposit of the adhesive agent occurs along that section of the work which is gripped by the work feeding clamp comprising the feeding work support or table 46 and the presser foot 48 (see Figs. 3 and 21 to 23 inclusive). To deposit the adhesive agent a nozzle 72 is secured to the feeding work support 46 by a screw 74 passing through a clamping plate 76 and into threaded angagement with the work support 46. In the illustrated machine the adhesive agent employed is compounded from known constituents particularly for good adhesion to nylon sewing thread and to leather or other fibrous materials. For this purpose it is composed of a rubber solution with an aromatic solvent such as toluol. An adhesive agent so composed surface hardens perceptibly within a fraction of a minute after being deposited so that slippage of the loops along one another and in the work operated upon is strongly resisted. After an hour or so the loops of thread are securely locked in place and the surface hardened cement then forms a solid ribbon 78 of uniform width as shown in Figs. 25 and 26 in which the enchained loops of thread are embedded.

For insuring that the deposit of adhesive agent on the seam will be uniform regardless of the adjustment in the length of each feeding movement imparted to the work by the work-feeding clamp, the deposit is timed to occur while the work-feeding presser foot 48 is raised from clamping engagement with the work and the work-feeding clamp including the work support 46 is being back fed. For actuating the means for depositing the adhesive agent, connections are provided between the depositing means and the mechanism for actuating the feeding clamp.

Figure 5:
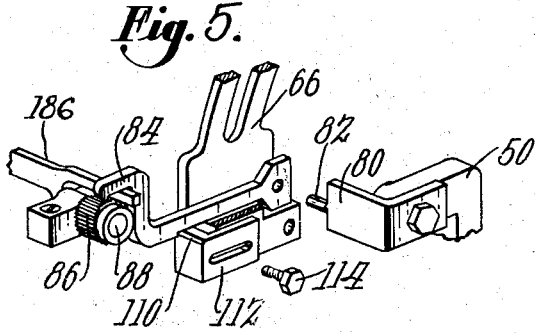
Fig. 5 is a perspective detail view with certain parts shown in separated relation of a ratchet and pawl connection in the machine for actuating an adhesive agent applying device.
Figure 13:
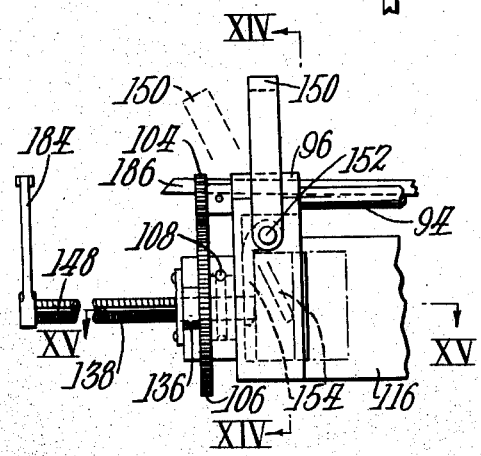
Fig. 13 is a detail view in rear elevation showing a portion of the driving connections for the adhesive agent applying device.
Figure 14:
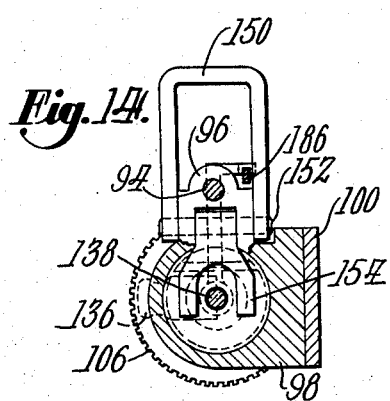
Fig. 14 is a a sectional view in right side elevation taken along the line XIV—XIV of Fig. 13.

The actuating connections for the adhesive depositing means are driven from a member of the feeding mechanism train, which member is located between the feed adjusting connections in that mechanism and the work-feeding clamp, so that any movement of the feeding clamp causes a corresponding movement of the adhesive depositing means regardless of feed adjustments. For this purpose the train of connections in the feeding mechanism which actuates the adhesive depositing means comprises the adjusting link 60 through the lower end of which passes the pin 58 connecting it with the link 56, the stud 54 which forms a pivotal connection between the link 56 and the feed carrier 50, an angle plate 80 (see Fig. 5) secured to the feed carrier 50 and a pin 82 projecting from one arm of the angle plate, which pin enters a perforation in an enlarged end of a reversely bent pawl 84. The pawl 84 at its free end engages teeth in a ratchet wheel 86 secured to a shaft 88 rotatable in a bearing 90 (see Figs. 8 and 9) in the frame of the machine. The shaft 88 is connected through a universal joint 92 with a second shaft 94 rotatable in a bearing 96 (see also Figs. 13 and 14) in a recessed block 98 connected to a plate 100 secured by screws 102 to the machine frame. At the end of the shaft 94 opposite the universal joint 92 is made fast a pinion 104 having teeth meshing with those on a spur gear 106. The hub of the spur gear 106 is recessed to receive a cylindrical projection from the block 98 (see Fig. 15) on which the spur gear is rotatably mounted. To prevent displacement of the spur gear from the projection on the block the projection is grooved and the spur gear hub is drilled to receive a pin 108 (Fig. 13) passing through the hub of the gear 106 and engaging the groove of the block 98. The connections thus described cause the spur gear to be rotated during back-feeding movement of the work-feeding clamp in an amount proportioned to the adjustment of the clamp bolt 64 within the slot of the plate 66. Thus for a long stitch a greater amount of rotation will be imparted to the spur gear and for a short stitch a smaller amount of rotation will be imparted. The spur gear 106 which comprises a part of the actuating connections for the adhesive agent depositing means is arranged to actuate the depositing means directly through its rotation.

To enable the amount of adhesive agent deposited on a seam to be increased or decreased with stitches of any given length regardless of feeding adjustments, the pawl 84 has a shoulder along its intermediate undersurface arranged to be engaged by a bevel edge 110 on an L-shaped block 112 (Fig. 5) adjustably secured to the side of the fixed plate 66. For this purpose a flange on the block 112 has a slot through which a clamp screw 114 (Fig. 3) passes into threaded engagement with the plate 66. When the clamp screw 114 is loosened the block 112 may be moved horizontally in one direction or the other to cause the shoulder of the pawl 84 to engage it sooner or later in its ratchet actuating movement. When the shoulder of the pawl engages the block 112 it causes the pawl to lift out of engagement with the ratchet wheel so that the length of the effective stroke on the pawl is controlled by the position of the block 112 on the plate 66.

Figure 11:
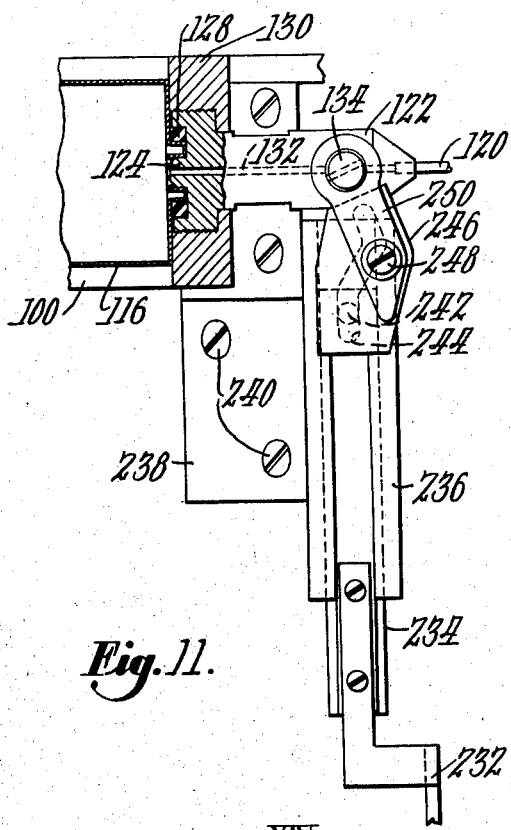
Fig. 11 is a detail view in rear elevation and on an enlarged scale showing a cutoff valve for the adhesive agent applying device.

For convenience in replenishing the supply of adhesive agent a novel form of quickly replaceable container or cartridge is provided, the container serving as the cylinder of a pump for exerting a force on the adhesive agent to cause it to be deposited on the work. The cartridge or container is indicated at 116 in Fig. 17 and is of circular cross section with sufficient length to provide a supply of adhesive agent for a machine during continued sewing operations throughout the major portion of an ordinary day's work allotment. When the supply of adhesive agent in the container 116 is exhausted the latter is discarded and a new one substituted in its place. For connecting the supply in the container with the depositing nozzle 72, the nozzle is surrounded at its rearward end by a flexible tube 118 (see Figs. 3 and 9) also surrounding a metal delivery tube 120 connected to the outlet of a delivery fixture 122 (Figs. 9, 10 and 11) arranged for quick connection with the outlet of the cartridge 116. For this purpose the fixture 122 is formed with a circular groove at its container-engaging end to form a nipple 124 (Fig. 11) which enters within a weakened projection at the outlet end of the container. To enable easy entry of the nipple on the fixture 122 within the weakened projection of the container, the outer face of the projection is provided with radiating score marks 126 (Fig. 18) so that when the container is pressed against the fixture 122, the score marks will enable the end of the projection on the container to be fractured into triangular tongues fitting the outer surface of the nipple on the fixture. The remainder of the projection on the container enters within the circular groove of the fixture to provide a liquid tight joint between the two as illustrated in Fig. 11. A ring 128 of rubber or other resilient material within the circular groove in the fixture 122 provides the liquid tight joint.

The delivery fixture 122 has its end next to the supply container formed with a threaded enlargement engaging similar threads in a disc 130 secured to the plate 100. The fixture 122 has a central passage 132 shown in Fig. 11 intersected by a transverse bore within which is fitted a cylindrical valve 134 arranged to cut off and admit the adhesive agent through the passage 132. Rotation of the valve 134 occurs at the end of a seam inserted by the machine, as will be explained to prevent flow of adhesive agent from the container 116 after the machine stops.

To cause the adhesive agent to be deposited when the spur gear 106 is rotated the spur gear hub has a radially extending rectangular opening in which a half nut 136 is slidingly mounted as shown more particularly in Fig. 15. The half nut has a semicircular threaded recess at one end which engages threads on a rod 138 passing through the hub of the spur gear 106 and through the projection of the block 98 on which rod the gear is rotatably mounted. At one end of the threaded rod 138 is secured a piston 140 of suitable diameter to fit snugly within the adhesive agent cartridge 116, the piston having a compression ring 142 to prevent leakage of the adhesive agent. When the piston is retracted from the container 116, a recess in the block 98 indicated at 144, surrounds the piston and holds it in alignment with the container. As the gear 106 is rotated with the half nut engaging the rod 138, the rod is held from rotation by a key 146 in the block 98 engaging a lengthwise groove 148 (Fig. 13) in the rod so that the rod and piston are propelled progressively into the container 116.

To apply a new filled container to the machine, its piston receiving end is moved into the recess of the block 98 and the outlet end of the container is brought into line with the nipple of the fixture 122. The container is then thrust forcibly against the fixture 122 to rupture the container along the score marks 126 with the nipple end of the fixture. This is accomplished by actuating a U-shaped handle 150 (Fig. 14) pinned to a shaft 152 passing through the block 98 just below the bearing 96. Also secured to the shaft 152 is a yoke 154, located within the recess 144 and so arranged that it acts on the piston to advance it within the container and to project the container forcibly against the delivery fixture 122, the piston advancing position of the handle and yoke being shown by broken lines in Fig. 13. To enable the piston to be advanced freely into the container in this way, the half nut 136 is moved out of engagement with the threaded rod 138 where it is held by a spring-pressed ball 156 (Fig. 15) mounted in an opening in the spur gear 106 and engaging one of two spaced indentations in the half nut. As soon as the piston has been advanced by the yoke 154, the half nut is returned manually into engagement with the threaded rod 138.

To enable the piston to enter within the filled container the end of the container opposite its outlet is formed by a close fitting disk 158 (Fig. 17) having its edge sealed to the inner surface of the container by a ring of soft solder 160. When the piston is advanced into the container by the yoke 154, the seal provided by the solder ring 160 is broken and the disc is carried along within the container with the piston.

In order that the adhesive agent may enter into intimate contact with the fibers of the sewing thread, indicated at 162 (Figs. 19 and 20), as it is drawn into the machine its outer surface is treated to clear it of waxes and oils applied during the process of manufacture. To this end a second adhesive or wetting agent in the form of a solvent is applied to the thread before reaching the needle and after passing from the friction discs 36 and the take-up 26. To treat the thread it is guided through a central perforation in a screw cap 164 of a solvent applicator 166. The applicator 166 is filled with absorbent cotton 168 and is in the form of an elbow fixture having a perforation 170 from which the thread passes to a pulley 172 (Fig. 2) mounted on the machine frame. To supply solvent to the absorbent cotton, a wick 174 enters the applicator fixture and extends through a connecting tube 176 to a reservoir 178 (Figs. 8 and 24) in the form of a glass screw top bottle engaging at its upper end with a cover 180 to which the tube 176 is secured. The cover 180 is secured to the underside of a mounting plate 182 projecting from the frame 2 of the sewing head, the tube 176 passing through the plate 182 and the cover 180 into the reservoir. Application of the solvent to the thread before reaching the needle is advantageous for lubricating the thread and for keeping the needle and other stitch-forming devices free of any accumulation of solidified adhesive.

When the supply of adhesive in the container 116 is exhausted, movement of the piston 140 is stopped automatically so that breakage of the parts of the piston actuating mechanism is avoided. To stop movement of the piston within the container 116 when the adhesive is exhausted, the piston rod carries an offset arm 184 (see Figs. 3, 8 and 13) pinned to its outer end opposite the piston 140. After the piston 140 is propelled to the limit of its travel within the container 116, the offset portion of the arm 184 engages the beveled end of a throw-off lever 186. The lever 186 runs parallel to the length of the container 116 and is fulcrumed on a pin 188 passing through an intermediate portion of the lever 186 and a sloted block 190 secured to the disk 130, the lever being mounted within the slot of the block. The other end of the lever 186 extends beneath the active end of the pawl 84 so that when the beveled end of the lever 186 is engaged by the arm 184, the pawl is raised from engagement with the ratchet wheel 86.

The solvent in the reservoir 178 when filled, causes the waxes and oils on the thread to be softened as the thread is drawn through the applicator 166, the solvent being drawn by capillary action into the absorbent cotton 168 through which the thread passes. Upon being drawn through the cotton 168, the softened waxes and oils are rubbed off the outer surfaces of the thread and drawn with the solvent as it penetrates the threads into its inner fibers, thus exposing the outer surface of the thread for intimate contact with the adhesive agent. Application of the solvent to the thread as it is being drawn toward the sewing point also assists in cooling the needle from the frictional heat generated in it as it penetrates and withdraws from the work in rapid succession. The frictional heat of the needle as it engages the thread and the frictional heat of the thread moving through the work also tends to throw off some of the softened wax from the outer surface of the thread for a still more favorable reception of the adhesive agent. During formation of the stitches some of the solvent which is squeezed out of the thread by engagement with the work is quickly absorbed by the work itself, rendering it also more receptive to the adhesive agent.

It has been found that a solvent composed of an aromatic, such as toluol, combined with naphtha, is effective with the use of the rubber adhesive agent referred to above. Such solvent is particularly effective because it is compatible with waxes and oils ordinarily applied to nylon sewing thread and also with the other adhesive agent.

To render the adhesive agent depositing means active or inactive whenever it is desired to do so the throw-off lever 186 is engaged by the lower end of a manually controlled lever 192 capable of movement into either of two positions, one of which is indicated in solid lines and the other in broken lines of Fig. 9. The control lever 192 is rotatable about a fulcrum screw 194 passing through the lever and into threaded engagement with a boss 196 on the head frame. At its upper end, the control lever is provided with a handle bent into a horizontal position and the lever engages a notched plate 198 also secured to the head frame. The plate 198 has two spaced notches 200 into one of which the lever fits while the throw-off lever is held in inoperative position and into the other of which the control lever fits while the throw-off lever disengages the actuating pawl 84 from the ratchet wheel. The lower end of the lever 192 carries a pin 202 projecting above the lever 186 to cause the end of the lever 186 extending beneath the pawl 84 to raise the pawl from its ratchet wheel when desired. The position of the control lever 192 shown in solid lines in Fig. 9 is that in which the pin 202 engages the throw-off lever to render the adhesive depositing means inactive.

The illustrated machine employs an accelerated timing of the stitch-forming devices with the exception of the looper 24, which enters each needle loop at a point in the motion of the needle more advanced than would be encountered in conventional machines of the Wilcox and Gibbs type. With this form of accelerated timing of the stitch-forming devices, and with the use of progressive tensioning of the thread in three or more previously formed stitches during a brief portion of each sewing cycle definite relaxation of tension taking place during the remainder of each cycle, the thread engaging the looper and the work throughout the three previously formed stitches is alternately tightened and relaxed, so that the adhesive agent is well distributed along hose portions of the thread to which it is applied. As shown in Fig. 32, the work-feeding support 46 is so arranged that its work-engaging surfaces in line with the seam do not extend in the direction of work feed beyond the nozzle, the work support 46 being grooved (Fig. 21) along the portion in line with the completed seam to receive the nozzle. In advance of the nozzle the work support 46 is slotted at 204 to admit the nonfeeding work support described more fully in application Serial No. 503,904. Thus, there is no contact of the adhesive agent with the feeding work support beyond its point of application. Because the adhesive agent is applied during backfeeding movement of the work support at the same rate as the backfeeding movement occurs, a deposit of uniform width is insured. The deposit becomes surface hardened in a matter of seconds after application, and it begins to form a solidified ribbon of cement bonding together the chain portions of the seam and the work itself.

For starting and stopping the machine the transmitter 12, which is of the same construction and manner of operation as that disclosed in United States Letters Patent No. 2,699,851, granted January 18, 1955, upon application of F. C. Eastman, is connected through a belt 206 to a pulley on the sewing shaft 70. The transmitter has a clutch and brake-controlling arm 208 shown in Fig. 1 connected to the treadle 14 by means of a link 210, a motion-multiplying lever pivoted at 212 on one of the legs of the sewing table and a connecting rod 214. The arm 20 is pivotally connected to the rod 214 and is pinned to the shaft to which the treadle 14 is also fixedly secured. The connections between the lever 208 and the treadle 14 are such that when the upper portion of the latter is depressed a driven clutch plate 216 separates from a brake member 218 in the transmitter and engages a driving clutch member 220 to cause rotation of the sewing shaft 70. When the treadle 14 is released at the end of a seam a spring 222 stretched between the motion-multiplying lever and the underside of the counter raises the control treadle and brings the sewing shaft to rest.

Figure 12:
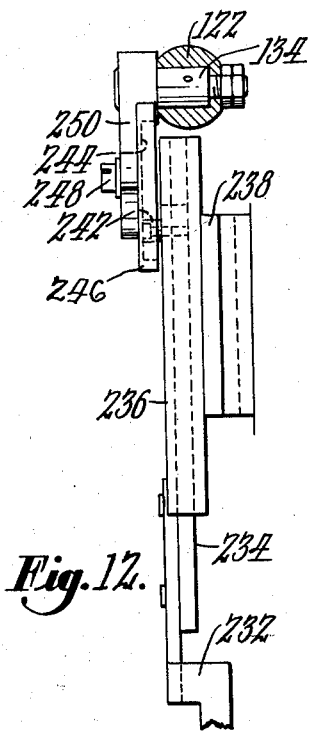
Fig. 12 is a sectional detail view of the adhesive agent applying device taken along a plane passing through the cutoff valve.

To stop application of adhesive agent to the work promptly when the machine is brought to rest the control treadle 14 is pivotally connected to the lower end of a treadle rod 224, the upper end of which is pivotally connected to a lever 226 (Figs. 1 and 2) formed by securing arms to the ends of a shaft 228 carried by a bracket 230 secured to the underside of the counter 10. The lever 226 has a rearwardly extending arm pivotally connected to the lower end of a link 232 extending through the counter 10, the link 232 having an upper offset end which has a screw connection with a slide 234 shown in Figs. 11 and 12. The slide 234 is confined in a vertical guideway 236 made fast to a plate 238 through which passes a pair of screws 240 entering the frame of the machine head. The guideway 236 is located directly beneath the valve 134 and carries a projecting pin 242 which enters into a cam slot 244 in a plate 246. The plate 246 is clamped by a screw 248 to an arm 250 fixed to the valve 134. The shape of the slot 244 is such that when the slide 234 moves upwardly as the machine is being started the valve 134 is opened to the flow of adhesive agent. When the slide is moved downwardly to the position shown in Fig. 11 the valve is closed so that the application of adhesive agent is stopped. The closing movement of the valve occurs when the treadle 14 is released from foot pressure, the lever 226 reversing the movement of the slide with respect to the treadle 14.

Figure 4:
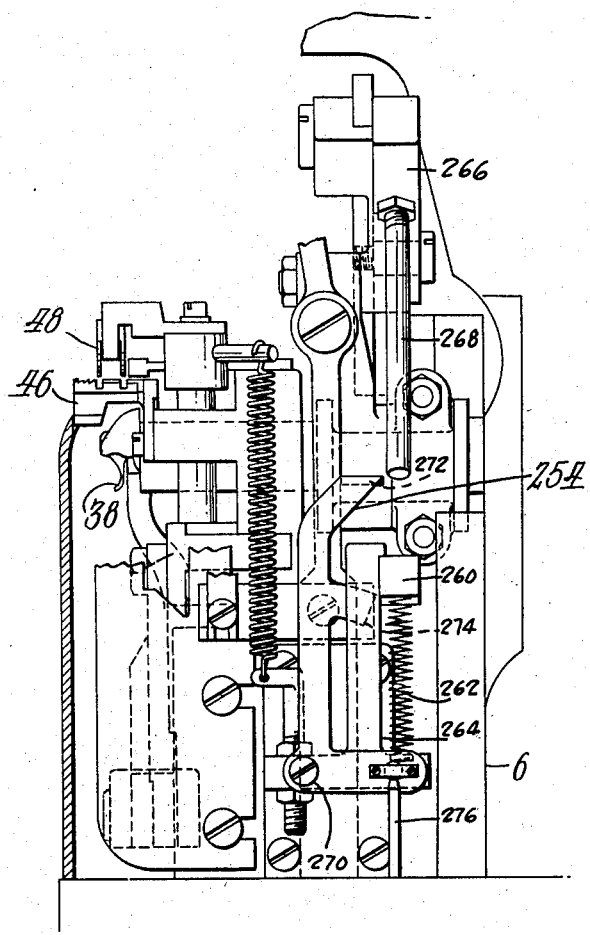
Fig. 4 is a view in front elevation on an enlarged scale of parts of the machine surrounding the sewing points, some of which have been broken away.

The machine more particularly described in the parent application also includes a thread cutter of novel construction and operation which acts to sever one side of the final loop of thread at the end of a seam at a sufficient distance from the work so that a suitable length of thread remains, and the possibility of unraveling the seam is thereby eliminated. More fully described and shown in the above referred to parent application are thread cutter actuating mechanims connected with the treadle 16 shown in Fig. 1 for moving a knife blade 252 comprising the thread cutter shown in Fig. 6. Also included as part of the disclosure of the parent application is a system of interlocks comprising lockouts for the thread cutter to prevent the movement of the blade 252 except when the machine is brought to rest and when such movement could not cause damage to the looper and other stitch-forming instrumentalities. One of the lockouts acts to prevent actuation of the thread cutter except when the needle is disengaged from the work. Other lockouts include an E-shaped lever 254 (Fig. 4) pivotally mounted on the machine frame and connected to the treadle 14, as more fully described in application Serial No. 503,904, above referred to. In addition, the parent application illustrates and describes in detail a device for pulling off a length of thread sufficient for the start of a new seam at the time that the blade 252 is moved to sever the thread at the end of a seam.

As may be seen in Figs. 3 and 6 the blade 252 is secured to the distal end of an arm 256 which is fixedly retained at one end of a horizontal shaft 258 journaled in a flange of the sewing head frame. A horizontal arm 260 is secured to the shaft 258 near its other end and is pressed upwardly near its outer end by a compression spring 262, best seen in Fig. 4, which enters a suitable recess in the arm. To limit its counterclockwise movement the arm 260 is engaged by a lateral projection of a vertical finger 264 which also has a recessed lug for retaining the spring 262. The blade 252 is advanced to its thread cutting position by a clockwise rotation of the shaft 258 as seen in Fig. 3. For this purpose a handle lever 266 is fulcrumed on the plate 66 and provided with a depending rod 268 threaded into the handle lever for engaging the arm 260 unless prevented from doing so by the E-shaped lever 254.

While the machine is in operation actuation of the thread cutter is prevented in two different ways by the lever 254 which is pivoted on a pin 270 and formed with an upermost arm terminating in a horizontal flange 272 and with an intermediate arm 274. During operation of the machine the lever 254 is displaced somewhat in a clockwise direction from the position shown in Fig. 4 so that the flange 272 and the arm 274 underlie the rod 268 and the arm 260 respectively, thereby blocking their clockwise movement. For actuating the lever 254 it is pivotally connected to a depending link 276 which at its lower end is also pivotally connected to the forward end of a horizontal arm 278 (Fig. 1) secured to the shaft 228 beneath the sewing table. When the treadle 14 is depressed to start the machine the connections already described cause the lever 254 to be pivoted to a position in which the thread severing blade is rendered inoperative. Upon release of the treadle for bringing the machine to a stop, the lever 254 is automatically returned to the position shown in Fig. 4 and no longer interferes with the actuation of the blade.

The feature of the invention relating to the machine and to the method for cement reinforcing sewed seams takes advantage of the use of the means for depositing adhesive agent on the chain portion of a chain-stitch seam along which a number of stitches are being tightened at the same time by application of tension to the last formed stitch in the seam. The use of the machine in this way is accomplished by locating the cement-depositing nozzle 72 at a position along the line of completed stitches spaced from the needle a distance at least equal to the length of two or more stitches from the point of needle operation. With the machine illustrated, the tightening action on the thread extends to the third or fourth stitch from the sewing point so that sliding movement of the thread loops on each other and along the surface of the work will take place with certainty at a point where the adhesive agent is being deposited.

The advantages of the improved shoe and of the method of making the same are illustrated in Fig. 26. In this figure a platform sole 286 is illustrated as having been introduced within a pocket formed by sewing together a sock lining 288, an upper 290, a cover strip 292 with a chain-stitch seam 294, the chain of which is laid on the cover strip and is reinforced by the continuous ribbon 78 of hardened cement. After inserting the platform sole the free edge of the cover strip is wrapped about the edge of the platform sole to form a crease within which the chain of the seam and the ribbon are enclosed. As the cover strip is wrapped about the edge of the platform sole it is tightened between the sole edge and the ribbon-reinforced seam with a crosswise lasting tension. The ribbon of cement normally forms a relatively sharp edge fitting within the crease of the covered strip and engaging the entire surface of the strip at opposite sides of the crease, the cement being bonded to the inner side of the cover strip. Thus, the cover strip engages a relatively smooth area on the cement ribbon greater than would be afforded by the threads of an uncemented seam. As a result the cement ribbon provides a firm backing, and there is less chance that the seam will gap and expose the thread in the seam than without such reinforcement. The cement backing of the seam in this way affords a straighter crease line in the cover strip and a more pleasing appearance in the shoe after completion than with an unreinforced seam. Also, greater strength and wearing qualities are obtained by this construction. After the cover strip has been wrapped about the platform sole 286 an outsole 296 is attached to complete the shoe.

The nature and scope of the invention having been indicated and a particular exemplification having been described, what is claimed is:

1. A machine for inserting a cement bonded chain-stitch seam, said machine having an eye-pointed needle and other stitch-forming and work-feeding devices in combination with means acting to tighten a number of stitches at the same time with progressively increasing tension along the seam, and means for depositing an adhesive agent on the chain portion only of the seam along the sitches which are being tightened.

2. A machine for inserting a cement bonded chain-stitch seam, said machine having an eye-pointed needle and other stitch-forming and work feeding devices in combination with means, including a looper, acting to tighten a number of stitches at the same time progressively while forming each stitch, said looper having a loop engaging surface formed to cause tension on the thread to be relaxed during part of each sewing cycle, and means for depositing an adhesive agent on the chain portion only of the previously formed stitches as they are being tightened.

3. A sewing machine having a needle and other devices co-operating with the needle to form stitches, means for clamping the work operated upon and for feeding it past the point of needle operation, means mounted on the clamping means for intermittently depositing an adhesive agent on the work beyond the point of operation of the needle during back-feeding movement of the clamping means, and means for adjusting the length of feeding movement imparted to the work by the feeding means, in combination with connections between the work clamping and feeding means and the adhesive agent depositing means to provide a uniform deposit of cement on the work regardless of the adjustment of the length of feeding movement imparted to the work clamping means.

4. A sewing machine having a needle and other devices co-operating with the needle to form stitches, means for clamping the work operated upon and for feeding it past the point of needle operation, means mounted on the clamping means for intermittently depositing an adhesive agent on the work beyond the point of operation of the needle during back feeding movement of the clamping means, and means for adjusting the length of feeding movement imparted to the work by the feeding means, in combination with means, including connections between the work-feeding means and the adhesive agent depositing means, for providing the same amount of adhesive agent deposit on the work regardless of the adjustment of the feeding means, and means for modifying the action of the connections thereby enabling the amount of adhesive agent deposit to be increased or decreased for any given feeding adjustment.

5. A sewing machine having a needle and other devices co-operating with the needle to form stitches, a nonfeeding clamp, a feeding clamp acting to grip the work alternately with the nonfeeding clamp to move the work the length of a stitch, means for depositing an adhesive agent on the work during relative movement between the feeding clamp and the work and means for adjusting the length of feeding movement imparted to the work by the feeding clamp, in combination with connections between the work-feeding clamp and the adhesive agent depositing means to provide a uniform deposit of adhesive agent on the work regardless of the adjustment of the length of movement imparted to the work by the feeding clamp.

6. A sewing machine having a needle and other devices co-operating with the needle to form stitches, a nonfeeding clamp having jaws acting on elongated areas of the work parallel to the line of the stitches at opposite sides of the stitch line, a feeding clamp having jaws acting along similar areas on the work alternating with the non-feeding clamp to move the work the length of a stitch, a train of mechanism for actuating the feeding clamp, means for depositing adhesive agent along the line of the seam during relative movement between the feeding clamp and the work, and means interposed in the train of feeding mechanism for adjusting the length of feeding movement imparted to the work by the feeding clamp, in combination with connections including a pawl and ratchet wheel driven from the feeding mechanism by a member of its train located between the feeding clamp and the adjusting means to provide a uniform deposit of adhesive agent on the work regardless of the adjustment of the length of stitch, said pawl being arranged to drive the ratchet wheel during back feeding movement of the feeding clamp.

7. A machine for inserting a cement bonded seam, said machine having an eye-pointed needle, a take-up and other stitch-forming and work-feeding devices and means for depositing an adhesive on the thread along a portion beyond the point of operation of the needle, in combination with means, including a solvent applicator mounted between the take-up and the needle through which the thread passes whereby the thread remains wet with solvent at the time of reaching the eye of the needle, for cooling the needle and keeping it free of accumulation of solidified adhesive.

8. A sewing machine having a needle and other stitch-forming and work-feeding devices, in combination with a pump for depositing an adhesive agent on the thread beyond the point of needle operation, connections comprising a pawl and ratchet between the pump and the work-feeding devices for driving the pump, and a cutoff valve means actuated on stopping the machine to prevent further application of adhesive agent to the thread after the machine is brought to rest.

9. A sewing machine having a main sewing shaft, a needle and other stitch-forming and work-feeding devices driven from the sewing shaft, a transmitter for driving the sewing shaft, a treadle for controlling the transmitter, means including a nozzle for depositing an adhesive agent on the thread employed in the machine and a thread cutting knife mounted for movement toward and from the thread to sever it beneath the nozzle at the end of a seam, in combination with a cutoff valve means actuated by the treadle to prevent deposit of adhesive agent on the thread after the machine is brought to rest and lock-out means actuated by the treadle to prevent operation of the thread cutter except when the machine is brought to rest.

10. The method of inserting a chain-stitch seam with cement bonded stitches including the steps of perforating the work, carrying a thread from one side of the work through successive perforations to the other side to form stitches and progressively tightening the stitches by intermittently applying and relaxing tension on the thread, which comprises the additional step of depositing an adhesive agent on the thread at the chain side only of the work beyond the point of operation of the needle on stitches being tightened and in a single continuous ribbon of uniform width whereby the adhesive is massaged into the thread before the stitches are fully set.

11. In a machine for inserting a cement bonded seam in a work piece, said machine including a needle and other stitch-forming devices, means for clamping the work piece and for feeding it past the point of needle operation, the combination of a nozzle mounted on the clamping means, an elongated cartridge of uniform internal cross section formed at one end with a boss having a weakened wall and with a detachably sealed cover secured to the cartridge at the other end by a frangible seal, a delivery fixture fitting the boss and having communication with the nozzle, said fixture including means for puncturing the weakened end wall and for forming a liquid tight connection with the cartridge, a piston adapted to engage the cover, and means for propelling the piston to break the seal of the cover within the cartridge and to advance the piston whereby the adhesive agent is forced out of the cartridge through the nozzle onto the work piece being operated upon.

References Cited in the file of this patent

UNITED STATES PATENTS

| | | |
|---|---|---|
| 660,130 | Thompson | Oct. 23, 1900 |
| 877,556 | Eaton | Jan. 28, 1908 |
| 881,283 | Arndt et al. | Mar. 10, 1908 |
| 945,045 | Plant | Jan. 4, 1910 |
| 2,418,169 | Fredericksen | Apr. 1, 1947 |

FOREIGN PATENTS

| | | |
|---|---|---|
| 649,390 | Germany | Aug. 21, 1937 |